United States Patent
Pahlke et al.

(10) Patent No.: US 11,724,911 B2
(45) Date of Patent: Aug. 15, 2023

(54) ELEVATOR CAR ACOUSTIC INTEGRITY CHECK

(71) Applicant: Otis Elevator Company, Farmington, CT (US)

(72) Inventors: Derk Oscar Pahlke, Berlin (DE); Lutz Hentschel, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 888 days.

(21) Appl. No.: 16/681,308

(22) Filed: Nov. 12, 2019

(65) Prior Publication Data

US 2021/0139276 A1 May 13, 2021

(51) Int. Cl.
*B66B 5/00* (2006.01)
*G01H 7/00* (2006.01)

(52) U.S. Cl.
CPC .......... *B66B 5/0031* (2013.01); *B66B 5/0025* (2013.01); *G01H 7/00* (2013.01)

(58) Field of Classification Search
CPC ... B66B 5/0031; B66B 5/0025; B66B 5/0018; B66B 11/0246; G01H 7/00
See application file for complete search history.

(56) References Cited

U.S. PATENT DOCUMENTS

| | | | | |
|---|---|---|---|---|
| 10,440,498 | B1 * | 10/2019 | Amengual Garí | G01H 7/00 |
| 11,112,389 | B1 * | 9/2021 | Robinson | G01H 7/00 |
| 11,262,234 | B2 * | 3/2022 | Kang | G01H 7/00 |
| 2009/0166133 | A1 * | 7/2009 | Tyni | B66B 5/0025 187/393 |
| 2019/0013785 | A1 * | 1/2019 | Bogli | H03G 3/301 |
| 2019/0080709 | A1 * | 3/2019 | Wolff | G10L 21/0224 |
| 2019/0094358 | A1 * | 3/2019 | Wos | B66B 1/3492 |
| 2019/0367325 | A1 * | 12/2019 | Pahlke | G01R 19/00 |
| 2020/0148504 | A1 * | 5/2020 | Pahlke | B66B 5/0025 |
| 2020/0317471 | A1 * | 10/2020 | Kim | G01D 21/02 |
| 2020/0361745 | A1 * | 11/2020 | Pahlke | B66B 13/02 |
| 2021/0087017 | A1 * | 3/2021 | Pahlke | B66B 5/0018 |
| 2021/0139276 | A1 * | 5/2021 | Pahlke | B66B 5/0018 |

FOREIGN PATENT DOCUMENTS

| | | |
|---|---|---|
| CN | 101580198 A | 11/2009 |
| CN | 108476368 A | 8/2018 |
| CN | 108698786 A | 10/2018 |
| CN | 110407051 A | 11/2019 |
| JP | 2007031086 A | 2/2007 |
| JP | 2009215060 A | 9/2009 |
| WO | 2007020322 A1 | 2/2007 |
| WO | 2018151403 A2 | 8/2018 |

OTHER PUBLICATIONS

Office Action issued in Chinese Application No. 202011259292; Application Filing Date Nov. 12, 2020; dated Feb. 14, 2022 (8 pages).
European Search Report for European Application No. 20206811.0; Application Filing Date Nov. 10, 2020; dated Jul. 9, 2021 (8 pages).

* cited by examiner

*Primary Examiner* — Michael A Riegelman
(74) *Attorney, Agent, or Firm* — Cantor Colburn LLP

(57) ABSTRACT

An elevator car is provided and includes a body, an acoustic response device and a local or remote system configured to control an operation of the acoustic response device whereby an acoustic integrity check to determine a condition of the body is executable by the local or remote system.

14 Claims, 4 Drawing Sheets

ELEVATOR CAR ACOUSTIC INTEGRITY CHECK

BACKGROUND

The following description relates to elevator cars and, more specifically, to an elevator car with a capability of executing an acoustic integrity check.

As is well known, elevator cars are used in elevator systems to help people move themselves and/or cargo from one floor of a building to another floor. Typically, an elevator car includes a body defining an interior, one or more doors that provide access to the interior and a panel. The body can include a floor, a ceiling and one or more sidewalls. The one or more doors can be provided in the one or more sidewalls and can open or close to allow for ingress and egress with respect to the interior and to prevent ingress and egress while the elevator car is in motion. The panel can be housed in a sidewall and includes buttons by which users can control operations of the elevator car as well as alarm and communication devices that allow users to report issues. An elevator car also includes systems by which the elevator car interfaces with rails and pulleys of an elevator system, brakes that prevent undesirable movement of the elevator car along the rails and, in some cases, computing devices that allow the elevator car to communicate with control systems of the elevator system and other external computing systems.

Over time, many elevator cars exhibit damage resulting from various causes including, but not limited to, vandalism and wear. The amount of damage exhibited by an elevator car is a measure of an integrity of the elevator car.

In an elevator system, the integrity of an elevator car needs to be frequently checked and verified. While this can be done periodically by an operator or inspector, it is not generally feasible for an operator or inspector to conduct inspections in real-time. Such real-time analysis can be executed by certain types of sensors, it is often necessary to determine whether the elevator car in question is occupied by people or cargo in order to obtain a reliable reading. Cameras can do this but are expensive and require substantial computing power.

BRIEF DESCRIPTION

According to an aspect of the disclosure, an elevator car is provided and includes a body, an acoustic response device and a local or remote system configured to control an operation of the acoustic response device whereby an acoustic integrity check to determine a condition of the body is executable by the local or remote system.

In accordance with additional or alternative embodiments, the acoustic response device includes a speaker to output an acoustic signal into an interior of the body and a microphone to receive and record the echo from the interior.

In accordance with additional or alternative embodiments, the microphone scans for multiple acoustic frequencies including resonant frequencies of the body.

In accordance with additional or alternative embodiments, the speaker is provided as one or a plurality speaker of elements and the microphone is provided as one or a plurality of microphone elements.

In accordance with additional or alternative embodiments, the acoustic signal is at least one of an infrasound signal and an ultrasound signal.

In accordance with additional or alternative embodiments, the local or remote system identifies an acoustic fingerprint of the body and determines the condition of the body from a deviation of the acoustic fingerprint from a stored acoustic fingerprint.

In accordance with additional or alternative embodiments, at least one of the stored acoustic fingerprint is a base acoustic fingerprint, the local or remote system accesses one or more locally or remotely stored algorithms for learning to calculate the deviation and the local or remote system accounts for differing elevator states in calculating the deviation.

In accordance with additional or alternative embodiments, at least one of the acoustic response device and the local or remote system are at least one of battery powered and powered by harvested energy.

In accordance with additional or alternative embodiments, the elevator car further includes one or more additional sensors and the local or remote system is configured to confirm the condition of the body based on readings of the one or more additional sensors.

According to an aspect of the disclosure, an elevator car is provided and includes a body defining an interior to accommodate at least one of passengers and cargo, an acoustic response device configured to output an acoustic signal into the interior and to receive an echo of the acoustic signal from the interior and a local or remote system coupled to the acoustic response device and configured to analyze the echo and to determine, from analysis results, a condition of the body.

In accordance with additional or alternative embodiments, the acoustic response device is controllable by the local or remote system and includes a speaker to output the acoustic signal into the interior and a microphone to receive and record the echo from the interior.

In accordance with additional or alternative embodiments, the microphone scans for multiple acoustic frequencies including resonant frequencies of the body.

In accordance with additional or alternative embodiments, the speaker is provided as one or a plurality of speaker elements deployed at various locations throughout the body and the microphone is provided as one or a plurality of microphone elements deployed at various locations throughout the body.

In accordance with additional or alternative embodiments, the acoustic signal is at least one of an infrasound signal and an ultrasound signal.

In accordance with additional or alternative embodiments, the local or remote system analyzes the echo to identify an acoustic fingerprint of the body and determines the condition of the body from a deviation of the acoustic fingerprint from a stored acoustic fingerprint.

In accordance with additional or alternative embodiments, at least one of the stored acoustic fingerprint is a base acoustic fingerprint, the local or remote system accesses one or more locally or remotely stored algorithms for learning to calculate the deviation and the local or remote system accounts for differing elevator states in calculating the deviation.

In accordance with additional or alternative embodiments, at least one of the acoustic response device and the local or remote system are at least one of battery powered and powered by harvested energy.

In accordance with additional or alternative embodiments, the elevator car further includes one or more additional sensors and the local or remote system is further configured to confirm the condition of the body based on readings of the one or more additional sensors.

According to an aspect of the disclosure, a method of executing an acoustic integrity check of an interior of a body of an elevator car is provided. The method includes outputting an acoustic signal into the interior, receiving an echo of the acoustic signal from the interior, analyzing the echo to identify an acoustic fingerprint of the body, calculating a deviation of the acoustic fingerprint from a stored acoustic fingerprint and determining a condition of the body from the deviation.

In accordance with additional or alternative embodiments, the calculating of the deviation includes accounting for differing elevator states.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, an elevator car is provided with the capability of executing an acoustic integrity check that distinguishes between a base acoustic fingerprint of the elevator car and an acoustic fingerprint of the elevator car in a damaged condition with or without people and/or cargo occupying the interior of the elevator car.

Figure 1:
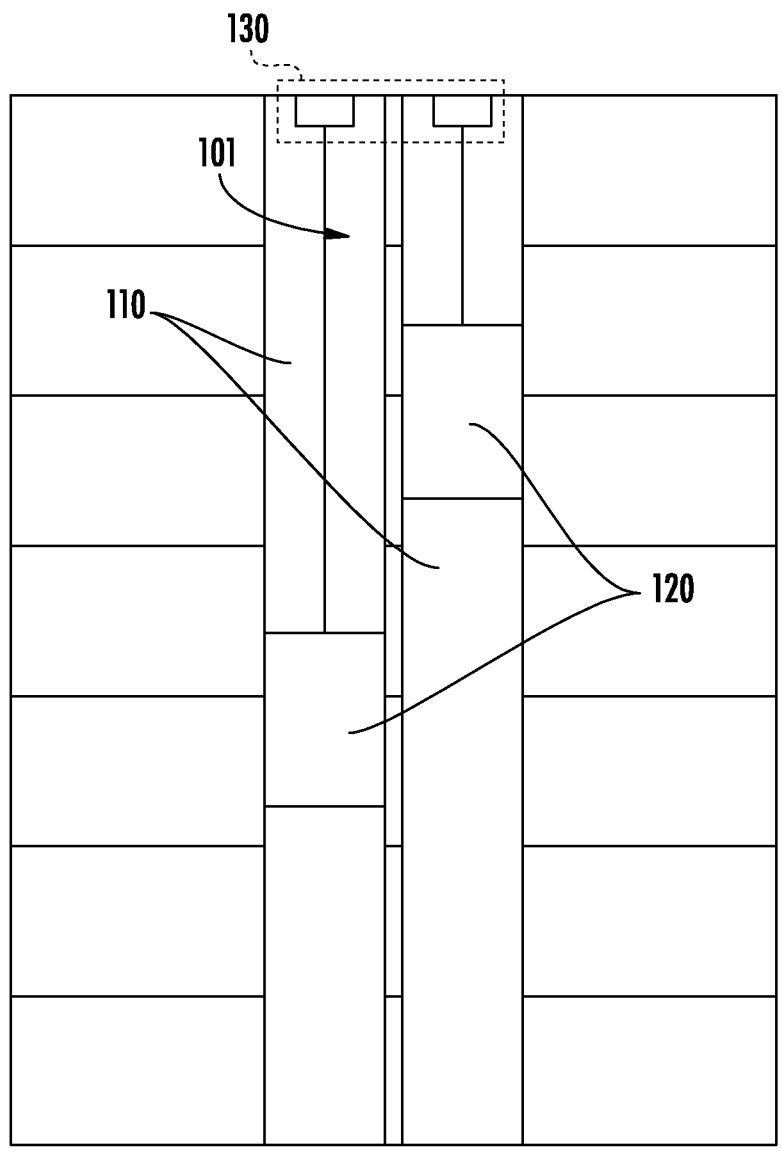
FIG. 1 is a schematic illustration of an elevator system in accordance with embodiments.

With reference to FIG. 1, an elevator system 101 is provided for use in a building, such as an office or an apartment building, for example. As shown in FIG. 1, the elevator system 101 includes one or more hoistways 110 that traverse one or more floors of the building, elevator cars 120 that move from floor to floor within the hoistways 110 and a control system 130 that controls the movements of each of the elevator cars 120.

Figure 2:
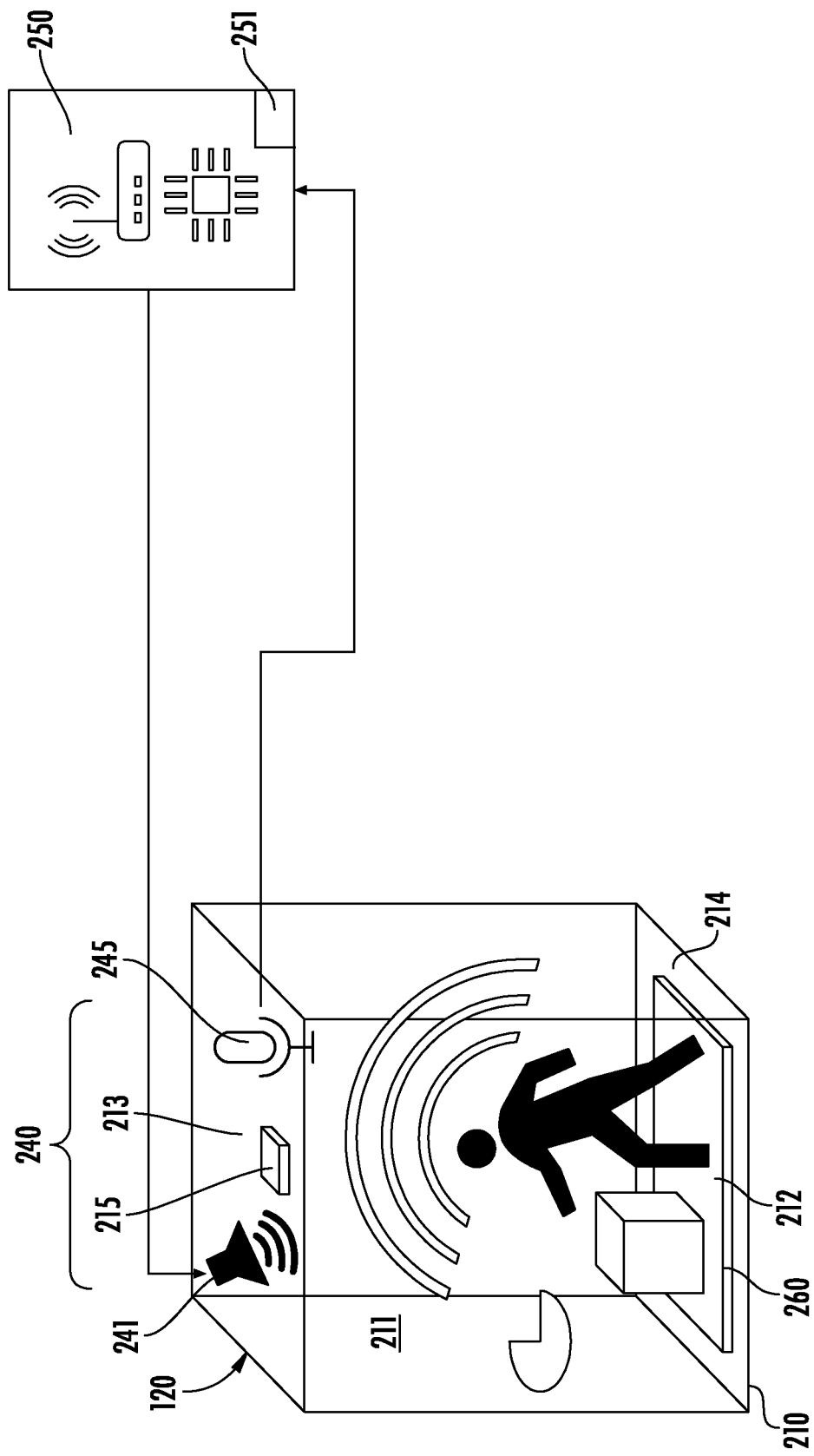
FIG. 2 is a schematic illustration of an elevator car of the elevator system of FIG. 1 in accordance with embodiments.

With continued reference to FIG. 1 and with additional reference to FIG. 2, each elevator car 120 includes a body 210 defining an interior 211 to accommodate at least one of passengers and cargo, one or more doors (not shown) that provide access to the interior 211, a panel (not shown), an acoustic response device 240 and a local or remote system 250. The body 210 can include a floor 212, a ceiling 213 and one or more sidewalls 214. The one or more doors can be provided in the one or more sidewalls 214 and can open or close to allow for ingress and egress with respect to the interior 211 and to prevent ingress and egress while the elevator car 120 is in motion. The panel can be housed in a sidewall 214 and includes buttons by which users can control operations of the elevator car 120 as well as alarm and communication devices that allow users to report issues. Although not specifically shown, the elevator car 120 can also include systems by which the elevator car 120 interfaces with rails and pulleys of the control system 130 and brakes that prevent undesirable movement of the elevator car 120 along the rails.

In accordance with embodiments, at least one of the acoustic response device 240 and the local or remote system 250 are at least one of battery powered (see battery 251 in FIG. 2), powered by harvested energy from light in the elevator car 130 (see the light fixture 215 in FIG. 2) and hard-wired.

In accordance with embodiments, the elevator car 130 can further include one or more additional sensors 260. The one or more additional sensors 260 can include, but are not limited to, weight sensors, optical sensors to sense an amount of light in the interior 211, sound sensors, temperature sensors, cameras, etc.

The acoustic response device 240 is configured to output an acoustic signal into the interior 211 and to receive an echo of the acoustic signal from the interior 211. The acoustic response device 240 is at least partially controllable by the local or remote system 250 whereby the local or remote system 250 can cause the acoustic response device 240 to output the acoustic signal and to receive the echo in accordance with at least one of a predefined schedule, certain instances occurring, varying elevator states being in effect, etc. The acoustic response device 240 can include a speaker 241 and a microphone 242. The speaker 241 outputs the acoustic signal into the interior 211 and the microphone 242 receives the echo from the interior 211. The speaker 241 can be provided as a single speaker or as a plurality of speakers 241 that are deployed throughout the body 210 and operable dependently or independently of one another. The speaker(s) 241 can output the acoustic signal at varying frequencies including, but not limited to, audible frequencies, infrasound frequencies, ultrasound frequencies, etc. The microphone 242 can also be provided as a single microphone or as a plurality of microphones 242 that are deployed throughout the body and operable dependently or independently of one another. The microphone(s) 242 can be configured to scan for multiple frequencies including, but not limited to, resonant frequencies of the body 210 for maximizing a response and for achieving a maximized sensitivity.

It is to be understood that, while the speaker 241 and the microphone 242 of FIG. 2 are shown on the ceiling 213 of the body 210 of the elevator car 130, they may be placed at any desired location within or on the body 210 of the elevator car 130.

Figure 3:
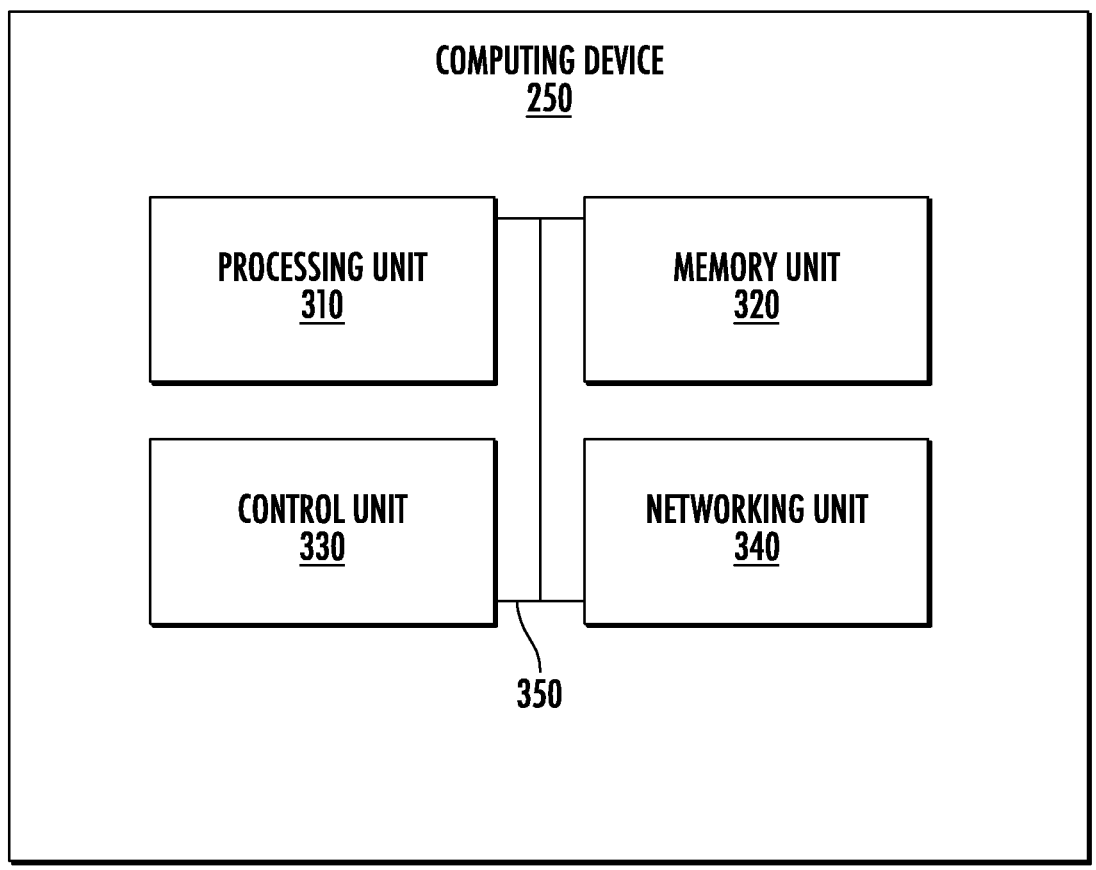
FIG. 3 is a schematic diagram of a local or remote system of the elevator car of FIG. 2 in accordance with embodiments.

With continued reference to FIGS. 1 and 2 and with additional reference to FIG. 3, the local or remote system 250 is coupled to the acoustic response device 240 and is configured to analyze the echo received by the microphone (s) 242 and to determine, from results of the analysis, a condition of the body 210. In accordance with embodiments, the condition of the body 210 can include, but is not limited to, an integrity of the body 210. As used herein, the integrity of the body 210 is a measure of an amount of damage experienced or exhibited by the body 210. As shown in FIG. 3, the local or remote system 250 includes a processing unit 310, a memory unit 320, a control unit 330, a networking unit 340 and a bus 350 by which the processing unit 310, the memory unit 320, the control unit 330 and the networking unit 340 are communicative.

It is to be understood that the local or remote system 250 can be a part or component of an elevator controller, a stand-alone unit, embodied in the cloud or embodied in an application of a mechanic's hand-held device, smartphone or any other type of portable computing device.

The memory unit 320 has executable instructions stored thereon, which are readable and executable by the processing unit 310. When they are read and executed by the processing unit 310, the executable instructions cause the processing unit 310 to operate as described herein (operations of the local or remote system 250 described below are interchangeable with processing operations of the processing unit 310). The control unit 330 is instructed by the processing unit 310 to control various operations of the speaker(s) 241 and the microphone(s) 242 of the acoustic response device 240. The networking unit 340 is communicative with the control system 130 and with other external computing systems (e.g., an edge or cloud AI, cell networks: 4g, NB-IoT, cat M1, Lora, Sigfox, weightless, etc., using secure internet protocols such as UDP, TCP, etc., with payload and messaging encryption such as AES 256, for example).

In accordance with embodiments, the local or remote system 250 can control the acoustic response device 240 to operate at certain times. These certain times include, for example, an installation time before the elevator car 130 has been in use for a significant amount of time and thus has experienced or exhibits little to no damage and times when the elevator car 130 is known to be occupied by at least one or more of one or more passengers and one or more items of cargo (hereinafter referred to as varying elevator states). The operation of the acoustic response device 240 at the installation time allows the local or remote system 250 to establish a base acoustic fingerprint of the elevator car 130 and the operation of the acoustic response device 240 at the times when the elevator car 130 is known to be occupied allows the local or remote system 250 to establish acoustic fingerprints of the elevator car 130 at varying elevator states.

The establishment of the base acoustic fingerprint of the elevator car 130 can be accomplished by varying processes that all generally include the operation of the speaker(s) 241 and the microphone(s) 242 by the control unit 330. In an exemplary case, the varying processes further includes a recording of the echo received by the microphone(s) 242 in the memory unit 320 and an analysis of the recorded echo by the processing unit 310 to identify the base acoustic fingerprint of the body 210. The analysis can involve an execution of a fast Fourier transform (FFT) by the processing unit 310. The establishment of the acoustic fingerprints of the elevator car 130 at the varying elevator states can be accomplished by similar processes.

During a lifetime of the elevator car 130, the local or remote system 250 can control the acoustic response device 240 to operate at additional times in accordance with a predefined schedule and the occurrences of certain instances. In any case, the local or remote system 250 controls the acoustic response device 240 to operate at the additional times in order to identify further or current acoustic fingerprints of the body 210 so as to ascertain the condition of the body 210. To this end, the identification of the further or current acoustic fingerprints of the body 210 can be accomplished similarly as described above whereupon the local or remote system 250 determines the condition of the body 210 from a deviation of the further or current acoustic fingerprints from one or more stored acoustic fingerprints (i.e., the base acoustic fingerprint and/or the acoustic fingerprints of the elevator car 130 at the varying elevator states).

In accordance with embodiments, the local or remote system 250 can access one or more locally or remotely stored algorithms (i.e., the Cloud AI) for learning to or for improving on its calculation of the deviation. In addition, the local or remote system 250 accounts for differing elevator states in calculating the deviation. That is, the local or remote system may only compare the current acoustic fingerprint of the elevator car 130 in a state in which the elevator car 130 is occupied by a single passenger to a previous acoustic fingerprint of the elevator car 130 which was known to have been in a state in which the elevator car 130 was similarly occupied by a single passenger. Thus, to an extent that the deviation exists between the current and previous acoustic states, the local or remote system 250 can assume it is not due to a different elevator state being in effect.

In accordance with further embodiments, the local or remote system 250 can be further configured to identify and confirm a state of the elevator car 130 and to confirm the condition of the body 210 based on readings of the one or more additional sensors 260. That is, sensor fusion information generated by the one or more additional sensors 260 (e.g., operational noise, light, acceleration, PIR, air pressure, etc.) can allow the local or remote system 250 to separate individual operational status instances of the elevator car 130 as well as to identify modes and positions of the elevator car 130 for more precise sensitivity and false positive elimination.

In an exemplary case, where the one or more additional sensors 260 include weight sensors on the floor 212 of the body 210 of the elevator body 130, readings of these weight sensors can be used by the local or remote system 250 to confirm that the elevator car 130 is occupied by a certain number of individuals (e.g., one adult and 2 children). Since these individuals will affect the acoustic fingerprint of the body 210, in an event the local or remote system 250 operates the acoustic response device 240 in this instance, the calculating of the deviation will involve the resulting acoustic fingerprint being compared against a stored acoustic fingerprint, which was taken at an earlier time when the elevator car 130 was also occupied by the certain number of individuals (ideally, one adult and two children).

Figure 4:
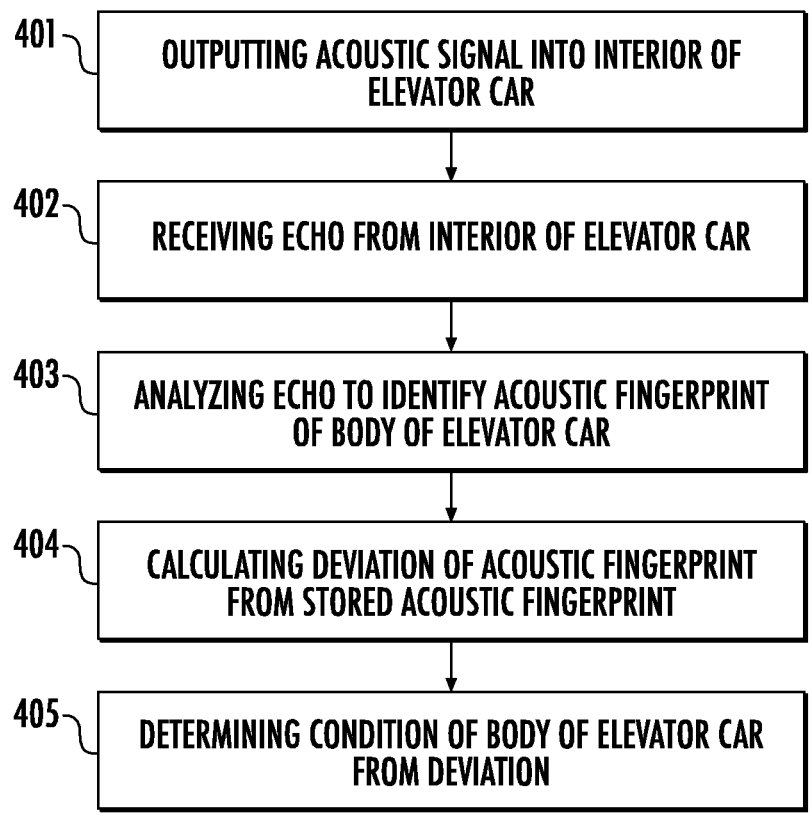
FIG. 4 is a flow diagram illustrating a method of executing an acoustic integrity check of an interior of a body of an elevator car in accordance with embodiments.

With reference to FIG. 4, a method of executing an acoustic integrity check of the interior 211 of the body 210 of the elevator car 130 as described above is provided. As shown in FIG. 4, the method includes outputting an acoustic signal into the interior (401), receiving an echo of the acoustic signal from the interior (402), analyzing the echo to identify an acoustic fingerprint of the body (403), calculating a deviation of the acoustic fingerprint from a stored acoustic fingerprint while taking into account differing elevator states among other factors (404) and determining a condition of the body from the deviation (405).

Technical effects and benefits of the present disclosure are the provision of an elevator car that can be serviced and maintained on a basis of a sensed condition and which allows for additional information about its integrity to be obtained. The systems described herein can be installed in an elevator car relatively easily, quickly and with reduced costs and allow for robust communications.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An elevator car, comprising:
   a body;
   an acoustic response device; and
   a local or remote system configured to control an operation of the acoustic response device whereby an acoustic integrity check to determine a condition of the body is executable by the local or remote system,
   wherein:
   the local or remote system identifies an acoustic fingerprint of the body and determines the condition of the body from a deviation of the acoustic fingerprint from a stored acoustic fingerprint, and
   at least one of:
   the stored acoustic fingerprint is a base acoustic fingerprint, the local or remote system accesses one or more locally or remotely stored algorithms for learning to calculate the deviation and the local or remote system accounts for differing elevator states in calculating the deviation.

2. The elevator car according to claim 1, wherein the acoustic response device comprises:
   a speaker to output an acoustic signal into an interior of the body; and
   a microphone to receive and record the echo from the interior.

3. The elevator car according to claim 2, wherein the microphone scans for multiple acoustic frequencies comprising resonant frequencies of the body.

4. The elevator car according to claim 2, wherein:
   the speaker is provided as one or a plurality of speaker elements, and
   the microphone is provided as one or a plurality of microphone elements.

5. The elevator car according to claim 2, wherein the acoustic signal is at least one of an infrasound signal and an ultrasound signal.

6. The elevator car according to claim 1, wherein at least one of the acoustic response device and the local or remote system are at least one of battery powered and powered by harvested energy.

7. The elevator car according to claim 1, further comprising one or more additional sensors wherein the local or remote system is configured to confirm the condition of the body based on readings of the one or more additional sensors.

8. An elevator car, comprising:
   a body defining an interior to accommodate at least one of passengers and cargo;
   an acoustic response device configured to output an acoustic signal into the interior and to receive an echo of the acoustic signal from the interior; and
   a local or remote system coupled to the acoustic response device and configured to analyze the echo and to determine, from analysis results, a condition of the body,
   wherein:
   wherein the local or remote system analyzes the echo to identify an acoustic fingerprint of the body and determines the condition of the body from a deviation of the acoustic fingerprint from a stored acoustic fingerprint, and
   at least one of:
   the stored acoustic fingerprint is a base acoustic fingerprint, the local or remote system accesses one or more locally or remotely stored algorithms for learning to calculate the deviation and the local or remote system accounts for differing elevator states in calculating the deviation.

9. The elevator car according to claim 8, wherein the acoustic response device is controllable by the local or remote system and comprises:
   a speaker to output the acoustic signal into the interior; and
   a microphone to receive and record the echo from the interior.

10. The elevator car according to claim 9, wherein the microphone scans for multiple acoustic frequencies comprising resonant frequencies of the body.

11. The elevator car according to claim 9, wherein:
    the speaker is provided as one or a plurality of speaker elements deployed at various locations throughout the body, and
    the microphone is provided as one or a plurality of microphone elements deployed at various locations throughout the body.

12. The elevator car according to claim 8, wherein the acoustic signal is at least one of an infrasound signal and an ultrasound signal.

13. The elevator car according to claim 8, wherein at least one of the acoustic response device and the local or remote system are at least one of battery powered and powered by harvested energy.

14. The elevator car according to claim 8, wherein the elevator car further comprises one or more additional sensors and the local or remote system is further configured to confirm the condition of the body based on readings of the one or more additional sensors.

* * * * *